(12) United States Patent
Filsfils et al.

(10) Patent No.: US 8,619,773 B2
(45) Date of Patent: Dec. 31, 2013

(54) SERVICE REQUEST PACKET INCLUDING AN EXTERIOR NETWORK PROTOCOL ATTRIBUTE

(75) Inventors: Clarence Filsfils, Brussels (BE); Cedell Adam Alexander, Jr., Durham, NC (US); Jim Guichard, New Boston, NH (US)

(73) Assignee: Cisco Technology, Inc., San Jose, CA (US)

( * ) Notice: Subject to any disclaimer, the term of this patent is extended or adjusted under 35 U.S.C. 154(b) by 539 days.

(21) Appl. No.: 12/846,811

(22) Filed: Jul. 29, 2010

(65) Prior Publication Data

US 2012/0027016 A1 Feb. 2, 2012

(51) Int. Cl.
*H04L 12/28* (2006.01)

(52) U.S. Cl.
USPC .......................................... 370/389; 370/392

(58) Field of Classification Search
USPC ................................................ 370/392, 389
See application file for complete search history.

(56) References Cited

U.S. PATENT DOCUMENTS

| | | | |
|---|---|---|---|
| 5,509,123 A * | 4/1996 | Dobbins et al. ............... | 709/243 |
| 7,860,100 B2 | 12/2010 | Khalid et al. | |
| 8,345,682 B2 | 1/2013 | Pignataro et al. | |
| 2002/0136235 A1 * | 9/2002 | Jarlstedt ........................ | 370/465 |
| 2004/0017796 A1 * | 1/2004 | Lemieux et al. ............... | 370/349 |
| 2007/0237147 A1 | 10/2007 | Quinn et al. | |
| 2008/0177896 A1 | 7/2008 | Quinn et al. | |
| 2008/0198849 A1 | 8/2008 | Guichard et al. | |
| 2008/0320303 A1 | 12/2008 | Khalid et al. | |
| 2009/0037713 A1 | 2/2009 | Khalid et al. | |
| 2010/0058329 A1 | 3/2010 | Durazzo et al. | |
| 2010/0165985 A1 | 7/2010 | Sharma et al. | |
| 2010/0254385 A1 | 10/2010 | Sharma et al. | |
| 2012/0002672 A1 | 1/2012 | Alexander, Jr. et al. | |
| 2012/0026897 A1 | 2/2012 | Guichard et al. | |
| 2012/0027016 A1 | 2/2012 | Filsfils et al. | |
| 2012/0033663 A1 | 2/2012 | Guichard et al. | |
| 2012/0033664 A1 | 2/2012 | Pignataro et al. | |

* cited by examiner

*Primary Examiner* — Sai-Ming Chan
(74) *Attorney, Agent, or Firm* — The Law Office of Kirk D. Williams

(57) ABSTRACT

Packets are encapsulated and sent from a service node to one or more application nodes for applying one or more Layer-4 to Layer-7 services to the packets. Before which for a packet, the service node performs a lookup operation based on a destination address of the packet in a routing data structure derived from a exterior network protocol, such as, but not limited to Border Gateway Protocol (BGP). This lookup operation results in the identification of a next hop packet switching device to which the packet would be sent from the service node. The service node includes this identification of the next hop address in the request packet sent to the application node(s). After the service(s) are applied to the packet, an application node will send the services-applied packet to this next hop address. In this manner, application nodes do not need to run an exterior network protocol. Although, they typically will run an Interior Gateway Protocol for identifying how to forward packets to the next hop address.

21 Claims, 7 Drawing Sheets

SERVICE DEFINITION AT
APPLICATION NODE

350

```
351 → ServiceWire   <service-name>
    352 → description  <text>
    353 → service-id   <service-id>
    354 → input        <input-service-interface>
    355 → output       <output-service-interface>
    356 → ((nexthop    <ip-address>
                       ([rewrite-service-id <service-id>])
                       [export-qos-group]) |
    356 → lasthop      [<ip-address>])
```

FIGURE 3B

SERVICEWIRE
RESPONSE
PACKET

380

| | |
|---|---|
| 381 | INFORMATION TO GET RESPONSE PACKET FROM APPLICATION NODE TO THE NEXT APPLICATION NODE OR TO THE SERVICE NODE IDENTIFIED BY THE NEXT HOP RECEIVED IN THE REQUEST PACKET (E.G., MPLS, ETHERNET, GRE, HDLC, PPP PACKET) |
| 382 | OPTIONAL SERVICEWIRE ENCAPSULATION (USED WHEN STAYING IN THE SERVICEWIRE DOMAIN; TYPICALLY THIS FIELD IS NOT USED) (E.G, HEADER WITH FIRST NIBBLE AS ZERO, AND TLVS SUCH AS: SERVICE ID TLV, VPN TLV, PARAMETERS TLV DEFINING SPECIFIC SERVICE FROM THE GENERAL SERVICE CORRESPONDING TO THE SERVICE ID) |
| 383 | SERVICES-APPLIED PACKET (E.G., IP PACKET) |

SERVICE REQUEST PACKET INCLUDING AN EXTERIOR NETWORK PROTOCOL ATTRIBUTE

TECHNICAL FIELD

The present disclosure relates generally to communicating information in a network.

BACKGROUND

The communications industry is rapidly changing to adjust to emerging technologies and ever increasing customer demand. This customer demand for new applications and increased performance of existing applications is driving communications network and system providers to employ networks and systems having greater speed and capacity (e.g., greater bandwidth). In trying to achieve these goals, a common approach taken by many communications providers is to use packet switching technology.

Layer-4 to layer-7 services are often applied to packets being sent through a packet switching device. Service Insertion Architecture teaches one approach to providing network services outside the packet switching device.

BRIEF DESCRIPTION OF THE DRAWINGS

The appended claims set forth the features of one or more embodiments with particularity. The embodiment(s), together with its advantages, may be best understood from the following detailed description taken in conjunction with the accompanying drawings of which:

FIG. 3B illustrates a configuration process performed in one embodiment; and

FIG. 3C illustrates a packet format used in one embodiment;

DESCRIPTION OF EXAMPLE EMBODIMENTS

1. Overview

Figure 1A:
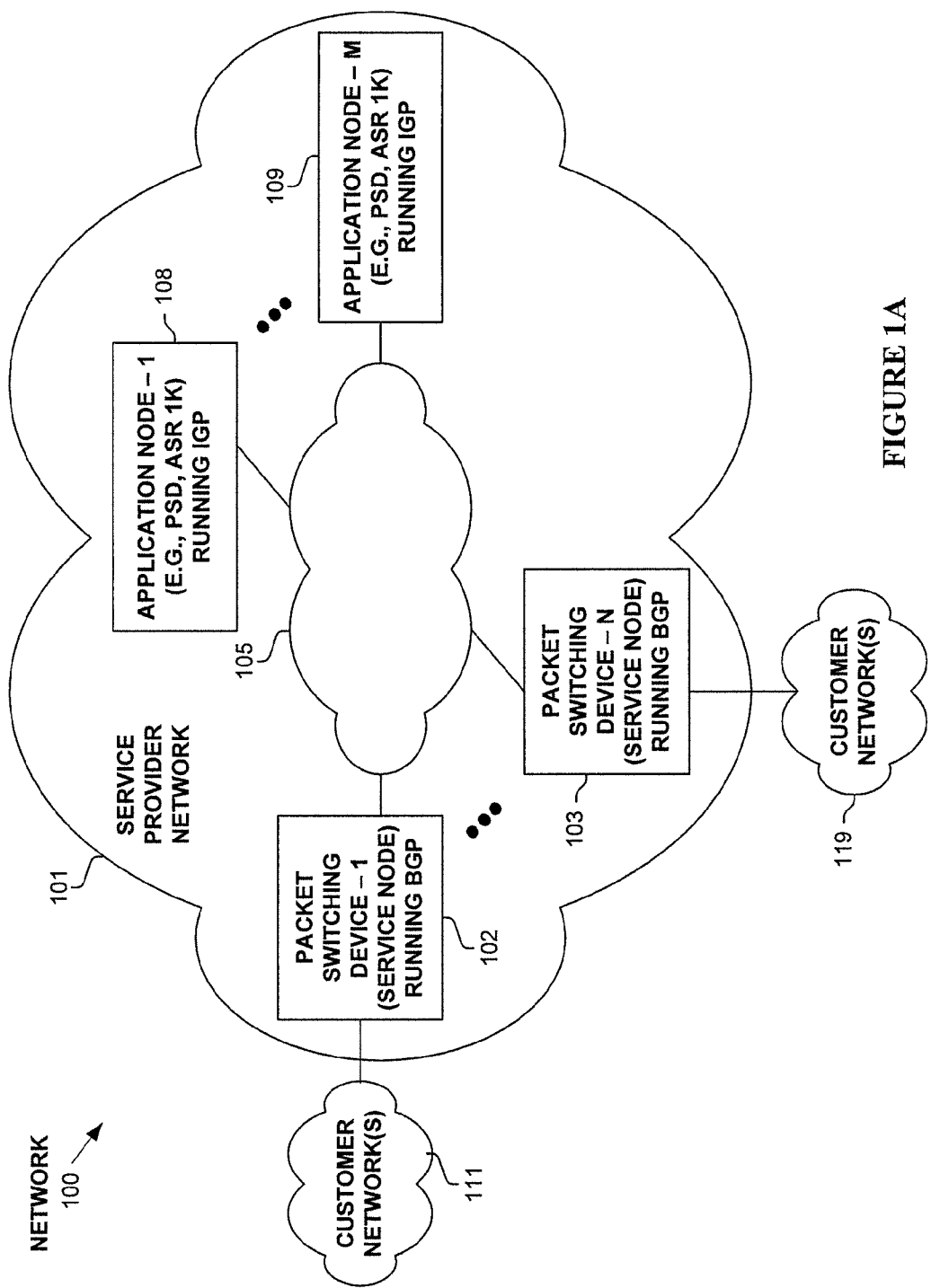
FIG. 1A illustrates a network operating according to one embodiment.

Disclosed are, inter alia, methods, apparatus, computer-storage media, mechanisms, and means associated with a service node (e.g., packet switching device) using one or more services applied to packets by an application node (e.g., a packet switching device and/or computing platform). An example of an application node used in one embodiment is a Cisco ASR 1000, which is a packet switching device with service processing capability.

In one embodiment, a packet switching device determines where a packet should be forwarded after one or more application nodes applies one or more services to the packet, and includes this information in the original service request sent to an application node. In one embodiment, the packet switching device performs a lookup operation on the destination address of the packet in a forwarding information derived from an exterior network protocol [e.g., Border Gateway Protocol (BGP)] to determine where to forward the services-applied packet. By providing this information to the application node(s), the application node(s) do not need to run an exterior network protocol (e.g., do not need to know how to route to every address on the Internet). In one embodiment, one or more of the application node(s) run an interior gateway protocol (IGP) [e.g., Intermediate System (IS-IS) or Open Shortest Path First (OSPF)] to learn how to forward packets within a provider network, such as to the next hop value determined by an application node.

One embodiment includes a method, comprising: storing, by a first packet switching device, forwarding information based on an exterior network protocol; performing, by the first packet switching device, a lookup operation in said forwarding information based on a destination address of a native packet to determine a second packet switching device to which the first packet switching device should forward the native packet; sending, by the first packet switching device, a request packet to an application node of one or more application nodes configured to apply one or more services to a representation of the native packet, with the request packet including the representation of the native packet and an identification of the second packet switching device; applying, by said one or more application nodes, said one or more services to the representation of the native packet resulting in a resulting packet; and sending, by a particular application node of said one or more application nodes, the resulting packet to the second packet switching device based on said identification of the second packet switching device included in the request packet.

In one embodiment, the exterior network protocol is Border Gateway Protocol (BGP). In one embodiment, the particular application node does not run Border Gateway Protocol (BGP). In one embodiment, the particular application node runs an Interior Gateway Protocol (IGP); wherein the method comprises: performing, by the particular application node, a lookup operation on a network address of the second packet switching device to determine how to send the resulting packet to the second packet switching device. In one embodiment, the IGP is Intermediate system to Intermediate System (IS-IS) or Open Shortest Path First (OSPF). In one embodiment, none of said one or more application nodes run Border Gateway Protocol (BGP). In one embodiment, the request packet includes a service identification of at least one service of said one or more services to be applied to the representation of the native packet by said one or more application nodes; and wherein said one or more application nodes are configured to apply said at least one service of said one or more services to the representation of the native packet. In one embodiment, said one or more services include at least one service from a group of services consisting of: layer-4, layer-5, layer-6, and layer-7 services. In one embodiment, said one or more services include at least one service from a group of services consisting of: Firewall (FW), Network Address Translation (NAT), Network-based Application Recognition (NBAR), authentication, encryption and Internet Protocol Security (IPsec).

In one embodiment, the request packet includes an identification of a virtual private network (VPN) to which the native packet is associated; wherein the resulting packet includes a VPN value corresponding to the identification of the VPN. In one embodiment, the resulting packet includes a Multiprotocol Label Switching (MPLS) label stack, including one or more labels for reaching the second packet switching device, and a label including the VPN value. One embodiment includes: determining, by the second packet switching device, how to send the request packet to an external device, which will then forward the request packet based on a destination address in a packet header of the request packet (and possibly the VPN value); and forwarding the request packet to the external device.

2. Description

Disclosed are, inter alia, methods, apparatus, computer-storage media, mechanisms, and means associated with a service node (e.g., packet switching device) using one or more services applied to packets by an application node (e.g., a packet switching device and/or computing platform). An example of an application node used in one embodiment is a Cisco ASR 1000, which is a packet switching device with service processing capability. Note, a particular packet having one or more services applied to it by an application node may be referred to herein as a services-applied packet or a resulting packet, regardless of whether the application of the service(s) to a packet resulted in the same particular packet, a modified particular packet, or a different packet.

Embodiments described herein include various elements and limitations, with no one element or limitation contemplated as being a critical element or limitation. Each of the claims individually recites an aspect of the embodiment in its entirety. Moreover, some embodiments described may include, but are not limited to, inter alia, systems, networks, integrated circuit chips, embedded processors, ASICs, methods, and computer-readable media containing instructions. One or multiple systems, devices, components, etc. may comprise one or more embodiments, which may include some elements or limitations of a claim being performed by the same or different systems, devices, components, etc. A processing element may be a general processor, task-specific processor, or other implementation for performing the corresponding processing. The embodiments described hereinafter embody various aspects and configurations, with the figures illustrating exemplary and non-limiting configurations. Note, computer-readable media and means for performing methods and processing block operations (e.g., a processor and memory or other apparatus configured to perform such operations) are disclosed and are in keeping with the extensible scope and spirit of the embodiments. Note, the term "apparatus" is used consistently herein with its common definition of an appliance or device. The term "packet" refers to a data packet or frame, such as, but not limited to, an Internet Protocol (IP) packet or Ethernet frame; and the format of a packet includes at least a packet header and payload.

Note, the steps, connections, and processing of signals and information illustrated in the figures, including, but not limited to any block and flow diagrams and message sequence charts, may typically be performed in the same or in a different serial or parallel ordering and/or by different components and/or processes, threads, etc., and/or over different connections and be combined with other functions in other embodiments, unless this disables the embodiment or a sequence is explicitly or implicitly required (e.g., for a sequence of read the value, process said read value—the value must be obtained prior to processing it, although some of the associated processing may be performed prior to, concurrently with, and/or after the read operation). Also note, nothing described or referenced in this document is admitted as prior art to this application unless explicitly so stated.

The term "one embodiment" is used herein to reference a particular embodiment, wherein each reference to "one embodiment" may refer to a different embodiment, and the use of the term repeatedly herein in describing associated features, elements and/or limitations does not establish a cumulative set of associated features, elements and/or limitations that each and every embodiment must include, although an embodiment typically may include all these features, elements and/or limitations. In addition, the terms "first," "second," etc. are typically used herein to denote different units (e.g., a first element, a second element). The use of these terms herein does not necessarily connote an ordering such as one unit or event occurring or coming before another, but rather provides a mechanism to distinguish between particular units. Moreover, the phrases "based on x" and "in response to x" are used to indicate a minimum set of items "x" from which something is derived or caused, wherein "x" is extensible and does not necessarily describe a complete list of items on which the operation is performed, etc. Additionally, the phrase "coupled to" is used to indicate some level of direct or indirect connection between two elements or devices, with the coupling device or devices modifying or not modifying the coupled signal or communicated information. Moreover, the term "or" is used herein to identify a selection of one or more, including all, of the conjunctive items. Additionally, the transitional term "comprising," which is synonymous with "including," "containing," or "characterized by," is inclusive or open-ended and does not exclude additional, unrecited elements or method steps. Finally, the term "particular machine," when recited in a method claim for performing steps, refers to a particular machine within the 35 USC §101 machine statutory class.

Disclosed are, inter alia, methods, apparatus, computer-storage media, mechanisms, and means associated with a service node (e.g., packet switching device) using one or more services applied to packets by an application node (e.g., a packet switching device and/or computing platform). Note, ServiceWire is a term used herein to refer to the technology (e.g., equipment, methods, protocols) used in communicating packets to and/or among one or more remote application node(s), the application of one or more services to a packet, and possibly the sending of the services-applied packet and/or other results to a ServiceWire-capable service node. For example, the packet encapsulation or information sent between service node(s) and/or application node(s) might be referred to as ServiceWire encapsulation or ServiceWire attributes.

Expressly turning to the figures, FIG. 1A illustrates network 100 operating according to one embodiment, wherein a service node (e.g., packet switching device 102-103) sends a packet to an application node (108-109) for performing one or more services to the packet by one or more application nodes (108-109). Network 100 illustrates a typical configuration of a service provider network 101, which has multiple edge packet switching devices 102-103 communicatively coupled to customer networks 111-119; and within service provider network 101, service provider nodes 102-103 and 108-109 are communicatively coupled via network (105).

Note, one embodiment performs the operations of sending packets to application node(s) for applying service(s) in one or more networks different than network 100; and one embodiment performs the operations of receiving packets by application node(s) for applying service(s) in one or more networks different than network 100.

As illustrated in FIG. 1A, packet switching devices 102-103 ("service nodes") are configured for sending packets to one or more application nodes 108-109 for applying one or more services. Thus, packet switching devices 102-103 do not have to have the capability to apply the service; rather, they can forward a packet to one or more application nodes 108-109 that will apply one or more services. This allows the development of new services to be performed by an application node 108-109, without having to integrate into a packet switching device 102-103, which is typically more costly in terms of development and testing.

After services are applied to a packet resulting in a "resulting" or "services-applied" packet the resulting packet is typically forwarded to one of packet switching devices 102-103. In one embodiment, the resulting packet is returned to the packet switching device 102-103 that sent the request packet to one or more application nodes 108-109. In one embodiment, the resulting packet is sent to a different packet switching device 102-103 than the one that sent the request packet to one or more application nodes 108-109.

Packet switching devices 102-103 typically run an exterior network protocol (e.g., Border Gateway Protocol) for accumulating forwarding information for packets. In one embodiment, before sending a request packet to one or more application nodes 108-109 for applying one or more services, a packet switching device 102-103 will perform a lookup operation on this forwarding information for the destination address of the packet to determine where it should be forwarded, with this information included in the request packet. Thus, an application node 108-109 does not need to run BGP, for example, as it will only need to know how to forward packets within network 100 (e.g., a service provider network). In one embodiment, application nodes 108-109 run an Interior Gateway Protocol (IGP), such as, but not limited to Intermediate system to Intermediate System (IS-IS) or Open Shortest Path First (OSPF) to acquire this information. In one embodiment, none or at least one of application nodes 108-109 does not run BGP nor some other external network protocol.

Figure 1B:
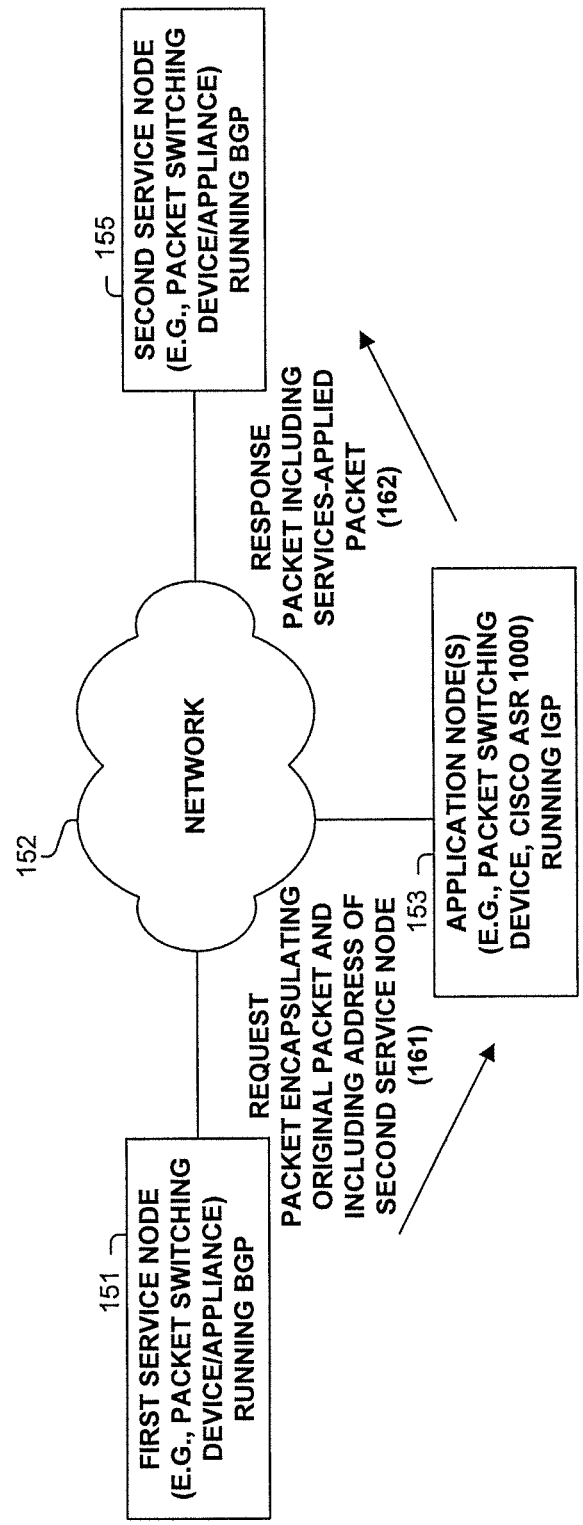
FIG. 1B illustrates a network operating according to one embodiment.

Next, shown in FIG. 1B is a generalized configuration including first and second service nodes 151 and 155 (e.g., packet switching devices/appliances), and application node(s) 153 (e.g., packet switching device/appliance such as, but not limited to, a Cisco ASR 1000), communicatively coupled via network 152. In one embodiment, the second service node is not aware of the use of an application node 153 to apply services.

As shown, first service node 151 runs BGP to determine forwarding information. First service node 151 performs a lookup operation in this forwarding information based on the destination address of a received or generated packet to determine where the packet should be forwarded. In this example, this determined next hop address is that of second service node 155. First service node 151 sends a request packet (161) encapsulating an original packet with an address of second service node 155 to application nodes 153, which applies one or more services to the original packet. A response packet is sent (162) from application node(s) 153 to service node 155 based on the next hop address of service node 155 included in request packet, with the response packet including the encapsulated services-applied packet (e.g., the result of one or more services being applied to the original packet, which is typically the same, or a modification of, the original packet).

Figure 1C:
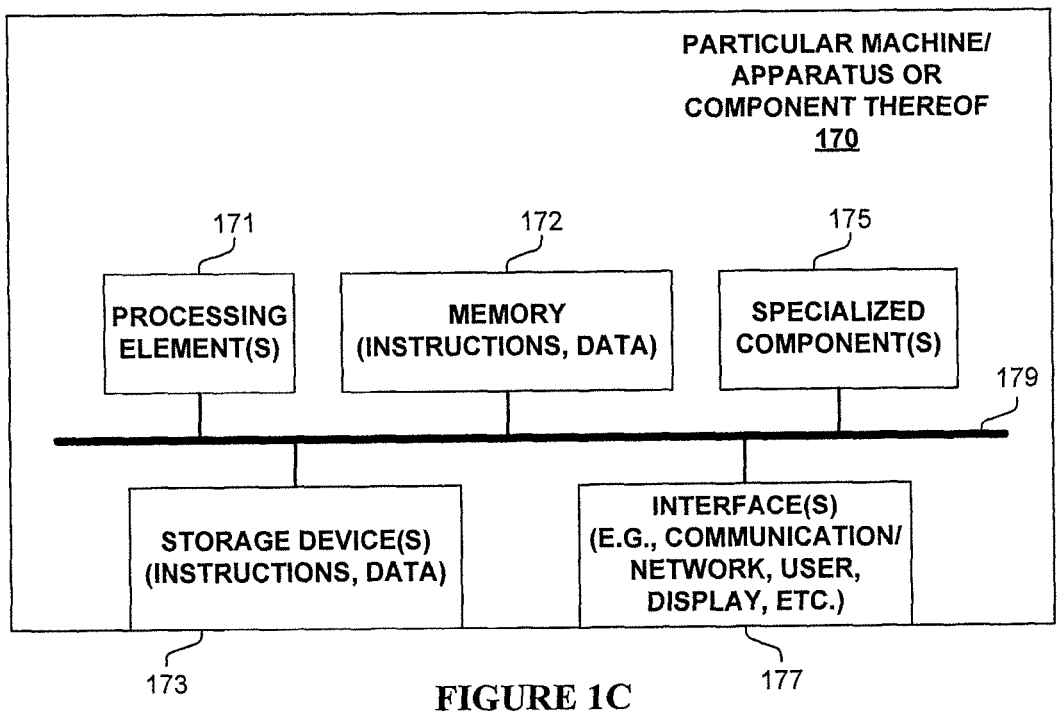
FIG. 1C illustrates an apparatus or component used in one embodiment.

FIG. 1C is a block diagram of an apparatus or component 170 used in one embodiment associated with a service node (e.g., packet switching device) using one or more services applied to packets by an application node (e.g., a packet switching device and/or computing platform). In one embodiment, apparatus or component 170 performs one or more processes corresponding to one of the flow diagrams illustrated or otherwise described herein.

In one embodiment, apparatus or component 170 includes one or more processing element(s) 171, memory 172, storage device(s) 173, specialized component(s) 175 (e.g. optimized hardware such as for performing operations, etc.), and interface(s) 177 for communicating information (e.g., sending and receiving packets, user-interfaces, displaying information, etc.), which are typically communicatively coupled via one or more communications mechanisms 179, with the communications paths typically tailored to meet the needs of the application. In one embodiment apparatus or component 170 corresponds to, or is part of, a service or application node illustrated in one of the other figures or otherwise described herein.

Various embodiments of apparatus or component 170 may include more or less elements. The operation of apparatus or component 170 is typically controlled by processing element(s) 171 using memory 172 and storage device(s) 173 to perform one or more tasks or processes. Memory 172 is one type of computer-readable/computer-storage medium, and typically comprises random access memory (RAM), read only memory (ROM), flash memory, integrated circuits, and/or other memory components. Memory 172 typically stores computer-executable instructions to be executed by processing element(s) 171 and/or data which is manipulated by processing element(s) 171 for implementing functionality in accordance with an embodiment. Storage device(s) 173 are another type of computer-readable medium, and typically comprise solid state storage media, disk drives, diskettes, networked services, tape drives, and other storage devices. Storage device(s) 173 typically store computer-executable instructions to be executed by processing element(s) 171 and/or data which is manipulated by processing element(s) 171 for implementing functionality in accordance with an embodiment.

Figure 2A:
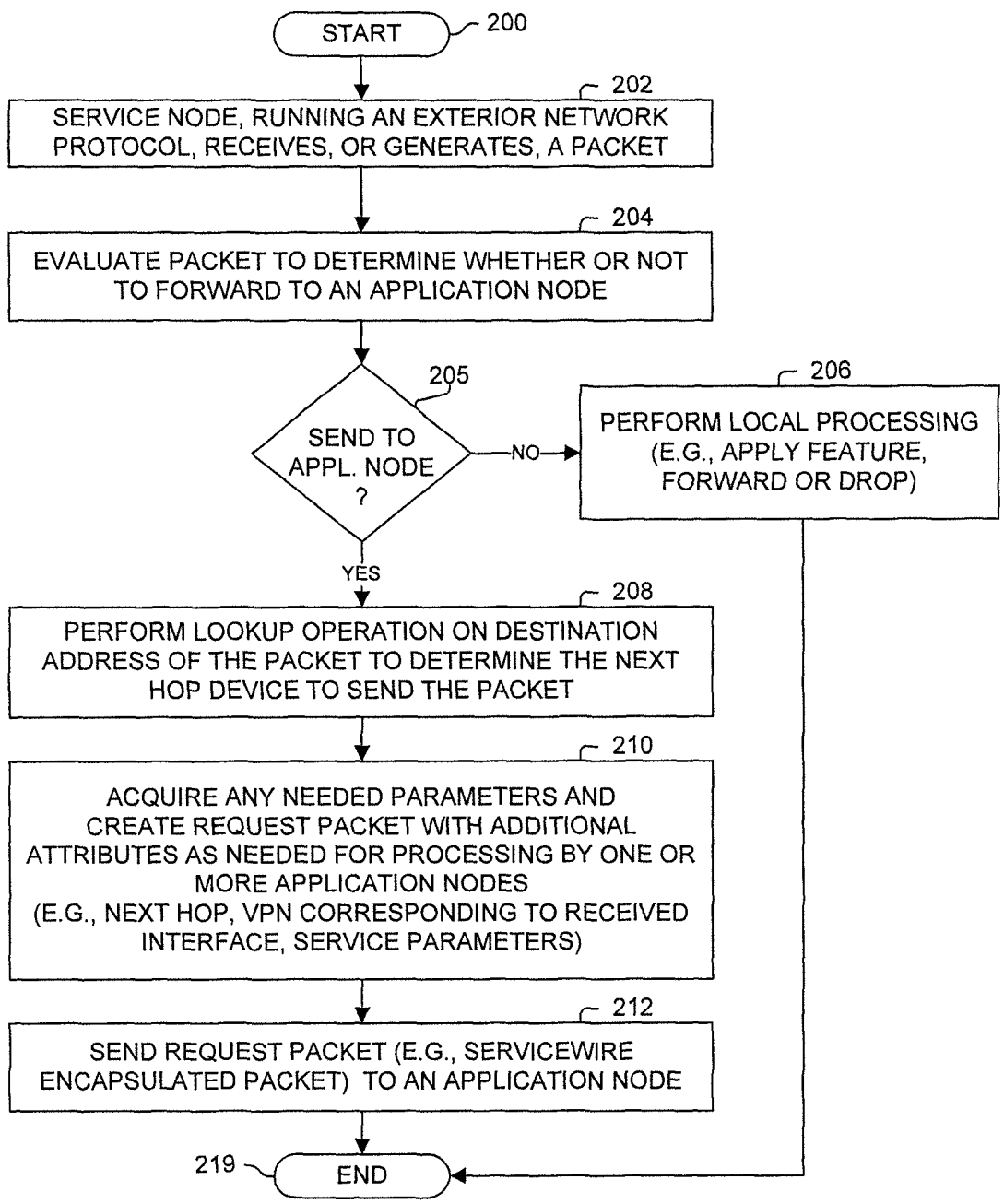
FIG. 2A illustrates a process performed in one embodiment.

FIG. 2A illustrates a process performed in one embodiment by a service node, such as, but not limited to, a packet switching device. Processing begins with process block 200. In process block 202, the service node receives or generates a packet. For example, the packet may be generated by the service node itself, or even by processing of another packet. In addition, this service node runs an exterior network protocol, such as BGP for acquiring forwarding information. In process block 204 (assuming it is not already known that the packet should be sent to an application node, e.g., based on a generated packet or all packets being sent to an application node), the packet is evaluated to determine whether or not it should be sent to an application node. As identified in process block 205, if the packet should not be sent to an application node, then in process block 206, normal local processing of the packet is performed (e.g., apply one or more features, forward or drop, etc.). Otherwise processing proceeds to process block 208, as process block 205 identified that the packet is to be sent to an application node for applying one or more Layer-4 to Layer-7 services by one or more application nodes to the packet.

Note, the use of the phrase "applying one or more services to the packet" includes a series of applications applied to the packet, with the packet possibly being modified between the application of some of these services such that one or more of the services is applied to a modified original packet. Further, examples of these Layer-4 to Layer-7 services include, but are not limited to, Firewall (FW), Network Address Translation (NAT), Network-based Application Recognition (NBAR), authentication, encryption and Internet Protocol Security (IPsec).

In process block 208, a lookup operation is performed in the forwarding information based on a destination address of a packet (e.g., the IP destination address in the IP header of the packet) to determine a next hop address to which the packet should be forwarded. In process block 210, any parameters (e.g., VPN identification, specialized service parameters, label stacks, etc.) are acquired, and the request packet is created. The request packet includes the original packet, as well as other ServiceWire attributes, such as, but not limited to: an identification of one or more services to be applied to the packet, an identification of the determined next hop value, an identification of a virtual private network (VPN) associated with the packet (e.g., a VPN associated with an interface on which the packet was received), etc. In one embodiment, the service identification is a single value. In one embodiment, the service identification includes the identification of a generalized service (e.g., Firewall) and a specific service of the generalized service (e.g., inside-to-outside, outside-to-inside). Next, in process block 212, the request packet (e.g., a ServiceWire packet encapsulating the original packet) is sent to an application node. Processing of the flow diagram of FIG. 2A is represented by process block 219.

Figure 2B:
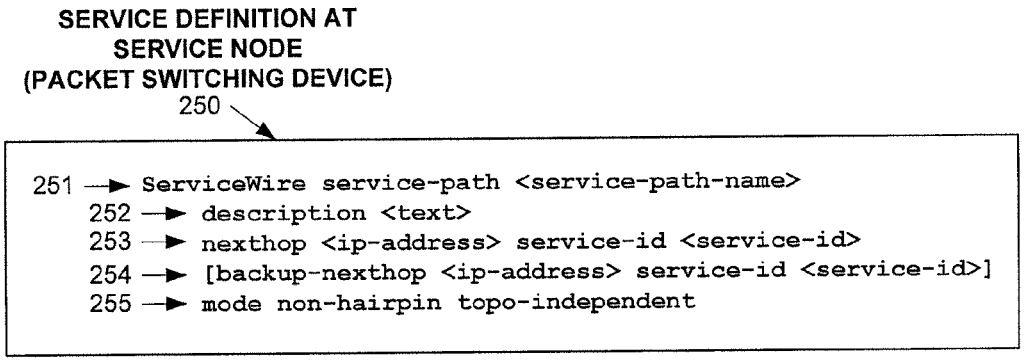
FIG. 2B illustrates a configuration process performed in one embodiment.

FIG. 2B illustrates a command 250, used in one embodiment, for configuring the service definition in a service node. As shown, command 250 includes:
- a user-defined name of the ServiceWire service (251);
- a user description/comment (252);
- application node definition (253) including the address of the application node to which to send a packet as well as the identification of the service(s) to be applied (e.g., which may be a specific service, or a generalized service and one or more values to define a specific service of the generalized service);
- backup application node definition (254); and
- mode non-hairpin (255) topological-independent defining that the one or more application nodes will send a response packet including the services applied packet to the next hop address (e.g., the address of an edge packet switching device).

Figure 2C:
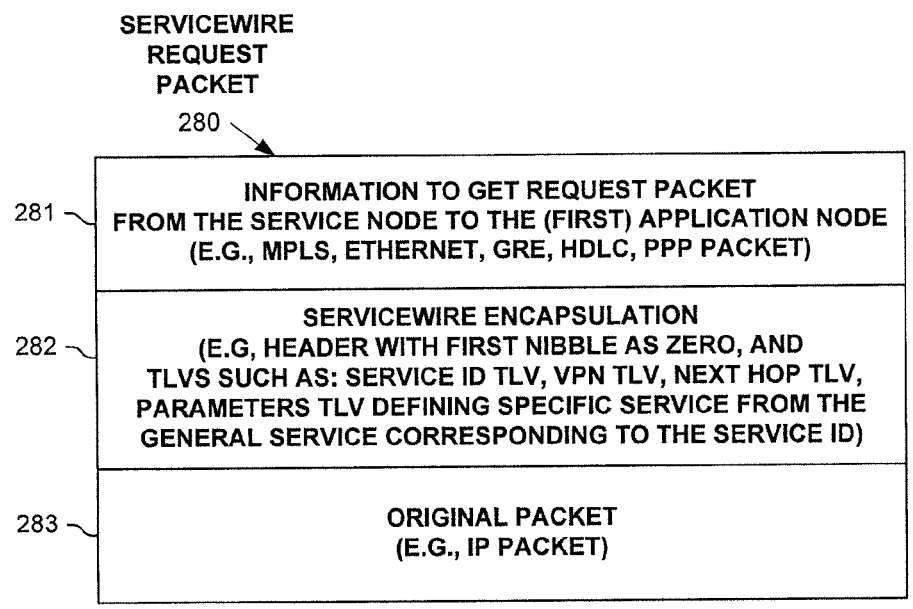
FIG. 2C illustrates a packet format used in one embodiment.

Next, FIG. 2C illustrates a ServiceWire request packet (280) used in one embodiment. As shown, request packet 280 encapsulates original packet 283, which is to have one or more services applied to it by one or more application nodes. In one embodiment, request packet 280 comprises one or more fields 281, which includes information to get the request packet from the service node to the first application node of one or more application nodes. The format of request packet 280 may be in one of an extensible number of formats, such as, but not limited to, MPLS, Ethernet, GRE, HDLC, PPP, etc., with one or more fields 281 conforming to the particular packet format. ServiceWire encapsulation 282 includes information required for defining the one or more applications to be applied to original packet 283, as well as possibly additional information (e.g., next hop information for where to send the services-applied packet, VPN information). In one embodiment such as when field 281 includes an MPLS label stack, field 282 has its first nibble as zero to identify ServiceWire encapsulation follows, when normally the first nibble would be four or six to identify an IPv4 or IPv6 packet is encapsulated. In one embodiment, ServiceWire encapsulation 282 encodes the ServiceWire information (e.g., identification of a service, identification of a general and specific services, next hop information, VPN information, etc.) in one or more Type-Length-Value (TLV) structures.

Figure 3A:
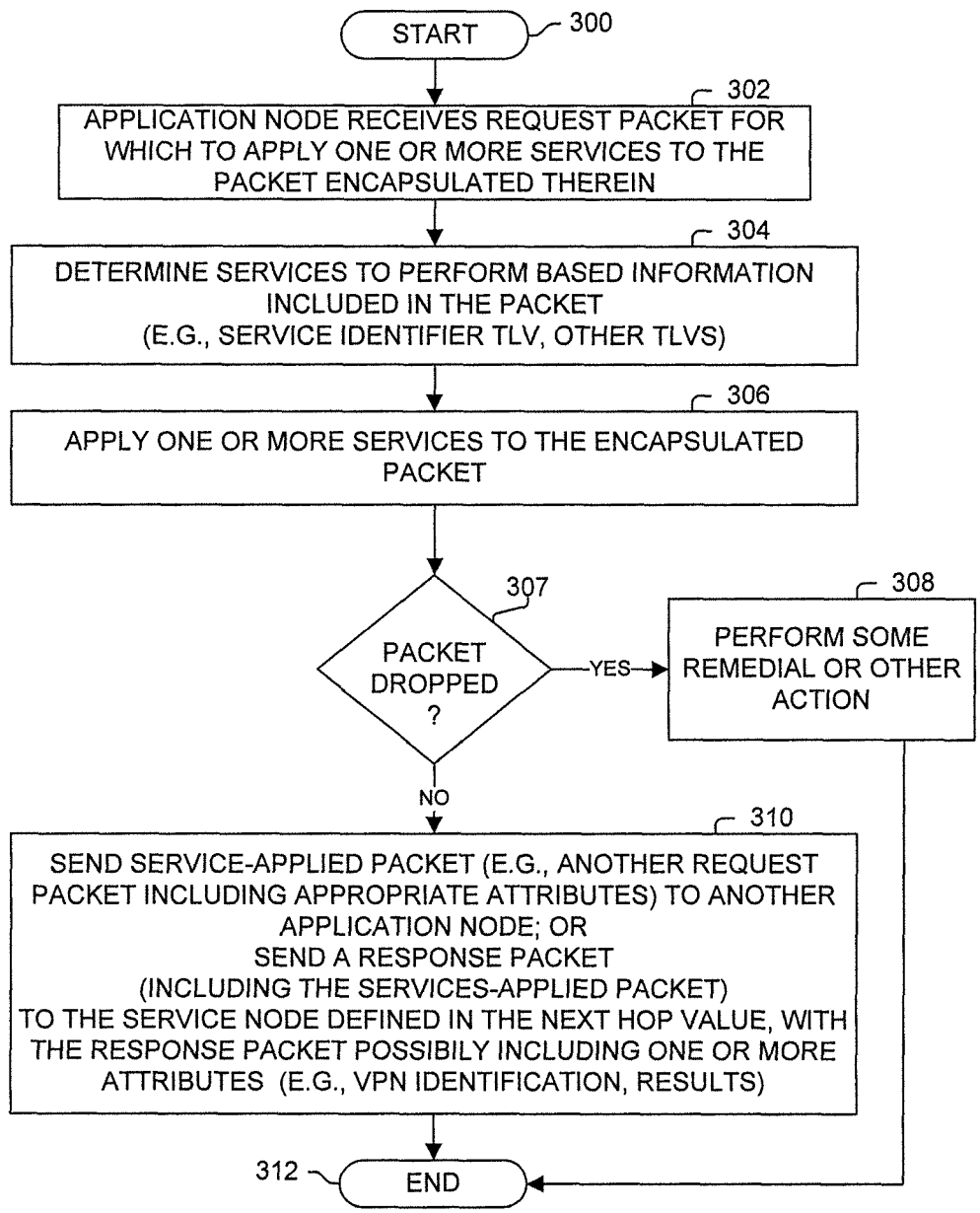
FIG. 3A illustrates a process performed in one embodiment.

FIG. 3A illustrates a process performed, in one embodiment, by an application node. Processing begins with process block 300. In process block 302, the application node receives the request packet for which to apply one or more services to the packet encapsulated therein. Typically, the application node is remote from the service node (e.g., communicatively coupled via a network external to the service and application nodes). In one embodiment, the service and application nodes are within a same packet switching appliance, such as with the application node being a blade server.

Next, in process block 304, the application node identifies, based on information included in the request packet (e.g., in the ServiceWire encapsulation) one or more services to apply to the encapsulated packet. In process block 306, the application node applies one or more of the identified service(s) to the encapsulated packet. As determined in process block 307, if the packet was dropped, then in process block 308, some remedial or other action is typically taken. Otherwise, in process block 310, the services-applied packet (e.g., the original packet or a modification thereof based on the application of one or more services) is sent in a request packet to another application node to apply one or more services; or the services-applied packet is sent to the address identified in a next hop attribute (e.g., the next hop address determined by the requesting service node). The response packet may include one or more attributes or other information, such as, but not limited to, an identification of a VPN associated with the services-applied packet (e.g., the same or different identifier identifying a VPN in the ServiceWire or other encapsulation of the received request packet). Processing of the flow diagram of FIG. 3A is complete as indicated by process block 312.

FIG. 3B illustrates a command 350, used in one embodiment, for configuring the service definition in an application node. As shown, command 350 includes:
- a user-defined name of the ServiceWire service (351);
- a user-defined description/comment (352);
- identification (353) of the service(s) to be applied (e.g., which may be a specific service, or a generalized service and one or more values to define a specific service of the generalized service), which corresponds the service identification in service node definition (253) in FIG. 2B;
- features (354) of the one or more services to be applied at an input-service-interface;
- features (355) of the one or more services to be applied at an output-service-interface; and
- optional forwarding information (356). If not included, a response packet will be created and sent to the originating service node. Otherwise, the nexthop keyword indicates a next application node in the service path (this is the service chaining case where the one or more services are applied by multiple application nodes). The optimize-l2 keyword enables a forwarding optimization for traffic received on native transport connections. When optimize-l2 is configured, an optimized forwarding mechanism that increases packet throughput is used for traffic received on native transport connections. The optimized forwarding mechanism is: swap the source and destination MAC addresses in the packet, and forward the packet back out the interface that it was received on. When the optional rewrite-service-id keyword is configured, the application node will use this as the identification (353) of the service to be applied by the next application node. When the optional export-qos-group keyword is configured, a qos-group value is included (e.g., in a TLV) in a packet sent from the application node, with this value typically used to set a QoS value in a packet switching system.

In one embodiment, when an application node sends a packet to another application node for applying additional services of the one or more services to be applied to a packet, it sends a request packet 280 of FIG. 2C to the next application node.

The following passage, before the description of FIG. 3C, describes the operation of one embodiment especially in regards to the use of nexthop 356 or lasthop 357 commands. After one or more services are to a packet by one or more application nodes, the services-applied packet is forwarded from an application node. In one embodiment, packet forwarding is controlled by the nexthop 356 or lasthop keyword 357 (one of these two keywords is always configured in one embodiment).

The nexthop keyword 356 indicates that the packet should be forwarded toward the configured ip-address using the ServiceWire data-plane encapsulations. The specified nexthop ip-address may be an IP address defined on:

- The originating service node (this is the typical "hairpin" case where the services-applied packet is returned to the originating service node after one or more services have been applied to the original packet—in contrast to the "non-hairpin" case where the services-applied packet is not returned to the originating service node); or
- The next application node in the service path (this is the service chaining case where multiple different application nodes are used to apply multiple services to the original packet).

When the nexthop keyword 356 is specified, the ServiceWire data-plane encapsulations are used when forwarding packets that have been serviced. When an ip-address is configured in conjunction with the nexthop keyword 356, the application node uses a routing table to forward the packet.

When the optional rewrite-service-id keyword is configured, the application node rewrites the service ID that is included in the ServiceWire data-plane encapsulation of the forwarded packet to the specified value. The rewrite-service-id keyword is typically used in conjunction with service chaining, wherein a packet is forwarded from one application node to another application node for applying one or more additional services.

The export-qos-group keyword is an optional parameter that enables exporting of a qos-group value set during service execution. If the export-qos-group parameter is not specified, then no qos-group value will be exported for the service. If the export-qos-group parameter is specified, and a set qos-group command is executed as part of service execution, then the qos-group value will be exported. A qos-group value is exported by including the value in the ServiceWire packet headers. The export-qos-group parameter is primarily intended for use in conjunction with the NBAR service (e.g., deep packet inspection), but can also be used independently from NBAR.

The lasthop keyword 357 indicates that the packet is to exit the ServiceWire domain, and return to the normal (e.g., IP, MPLS) routing domain, after the service is executed. Thus, if the lasthop keyword 357 is specified, the ServiceWire data-plane encapsulations are not used when forwarding packets after service execution.

If the lasthop keyword 357 is not specified and a BGP Next Hop TLV [e.g., the address of a packet switching device to which to send the services-applied packet, with the BGP Next Hop TLV being typically determined by the originating service node by performing a lookup operation in its routing table (e.g., that derived from an external routing protocol such as BGP) on the destination address of the original packet] is present in the ServiceWire data-plane encapsulation of a packet:

- the contents of the BGP Next Hop TLV are ignored by the application node, and
- the BGP Next Hop TLV is included in the ServiceWire header of the packet when it is forwarded by the application node.

When the optional ip-address parameter is configured in conjunction with the lasthop keyword 357, the application nodes forwards the packet toward the configured ip-address using the routing table. A primary motivation for this mode is support for forwarding to packet switching devices that do not support ServiceWire. This mode is a specialized form of the topology-independent, non-hairpin deployment model (where the application does not run BGP, for example, and the services-applied packet is not to be sent back to the original service node). If this mode is configured and a BGP Next Hop TLV is present in the ServiceWire data-plane encapsulation of a packet, the contents of the BGP Next Hop TLV are ignored by the application node.

If the lasthop keyword 357 is specified without the optional ip-address parameter, packet forwarding may be performed in accordance with the topology-independent deployment model or the topology-aware deployment model. Forwarding is performed in accordance with the topology-independent model when a BGP Next Hop TLV is present in the ServiceWire data-plane encapsulation of a packet. Forwarding is performed in accordance with the topology-aware model when the ServiceWire data-plane encapsulation of the packet does not contain a BGP Next Hop TLV (e.g., the application nodes performs a lookup operation on the destination address of the services-applied packet to determine how to forward the services-applied packet).

In the topology-aware model, the packet is forwarded toward the destination IP address in packet's IP header.

In the topology-independent model, packet forwarding is based on information in the BGP Next Hop TLV (e.g., the address of a packet switching device to which to send the services-applied packet, with this BGP Next Hop TLV being typically determined by the originating service node by performing a lookup operation in its routing table (e.g., that derived from an external routing protocol such as BGP) on the destination address of the original packet).

The last application node in the service path uses the contents of the BGP Next Hop TLV for forwarding when the service is configured using the lasthop keyword 357. This operation in one embodiment is as follows:

- The application node does a lookup in the forwarding information base (FIB) for the IPv4 address of the BGP Next Hop (and not on the destination address of the services-applied packet). The FIB is typically generated based on running an Interior Gateway Protocol (IGP) such as, but not limited to, Intermediate system to Intermediate System (IS-IS) or Open Shortest Path First (OSPF). Note, the application node does not need to run an exterior network protocol (e.g., BGP) because the BGP Next Hop value is that of a packet switching device in a provider's network; hence, the application node does not need to know how to route to the destination address of the packet (or all of the other addresses in the Internet).
- If this lookup fails to return a route, the services-applied packet is dropped (or possibly other remedial action taken, such as returned to the originating service node, or sending the packet to another packet switching device or service node).
- If the route is not over a Multiprotocol Label Switching Label Switched Path (MPLS LSP):
    - the services-applied packet is forwarded according to the route without any ServiceWire encapsulation, and any MPLS labels provided in the request packet (e.g., in a TLV) are ignored.

If the route is over a MPLS LSP and the BGP Next HOP TLV does not contain any labels, then the services-applied packet is forwarded according to the route without any ServiceWire encapsulation.

If the route is over a MPLS LSP and the BGP Next HOP TLV contains a label stack:
  the label stack from the BGP Next HOP TLV is pushed onto the services-applied packet as the bottom entries of the label stack,
  the transport labels for the MPLS LSP are then pushed onto the services-applied packet as the top entries of the label stack, and
  the services-applied packet is forwarded without any ServiceWire data-plane encapsulation.

Next, FIG. 3C illustrates a ServiceWire response packet (380) used in one embodiment. As shown, response packet 380 encapsulates the services-applied packet 383, which is the original packet after having the one or more services applied to it by one or more application nodes. Thus, services-applied packet 383 packet can be the original packet, or a modification thereof resulting from the application of these services.

In one embodiment, response packet 380 comprises one or more fields 381, which includes information to get the response packet from the application node to the address identified by the next hop value included in the request packet by the requesting service node. The format of response packet 380 may be in one of an extensible number of formats, such as, but not limited to, MPLS, Ethernet, GRE, HDLC, PPP, etc., with one or more fields 381 conforming to the particular packet format.

In one embodiment, services-applied packet 380 does not include ServiceWire encapsulation 382 and thus, packet 380 is not in the ServiceWire domain. In one embodiment, services-applied packet 383 also include ServiceWire encapsulation 382, which includes information for use by the service node in processing encapsulated services-applied packet 383 (e.g., VPN information so the service node can properly forward services-applied packet 383). In one embodiment such as when field 381 includes an MPLS label stack, field 382 has its first nibble as zero to identify ServiceWire encapsulation follows, when normally the first nibble would be four or six to identify an IPv4 or IPv6 packet is encapsulated. In one embodiment, ServiceWire encapsulation 382 encodes the ServiceWire information (e.g., identification of a service, identification of a general and specific services, VPN information, etc.) in one or more Type-Length-Value (TLV) structures. Note, in one embodiment, response packet 380 does not include ServiceWire encapsulation 382, as the application of services have been applied, and the packet switching or other device being sent the packet does not need to be ServiceWire aware (e.g., it does not need to understand ServiceWire encapsulation 382).

In view of the many possible embodiments to which the principles of our invention may be applied, it will be appreciated that the embodiments and aspects thereof described herein with respect to the drawings/figures are only illustrative and should not be taken as limiting the scope of the invention. For example, and as would be apparent to one skilled in the art, many of the process block operations can be re-ordered to be performed before, after, or substantially concurrent with other operations. Also, many different forms of data structures could be used in various embodiments. The invention as described herein contemplates all such embodiments as may come within the scope of the following claims and equivalents thereof.

What is claimed is:

1. A method, comprising:
   performing, by a first packet switching device in a network, a lookup operation in a forwarding information base (FIB) based on a destination address of a native packet to determine a second packet switching device in the network to which the first packet switching device should forward the native packet;
   sending, by the first packet switching device, a request packet to an application node of one or more application nodes in the network configured to apply one or more services to a representation of the native packet, with the request packet including the representation of the native packet and an identification of the second packet switching device;
   applying, by said one or more application nodes, said one or more services to the representation of the native packet resulting in a resulting packet; and
   sending, by a particular application node of said one or more application nodes, the resulting packet to the second packet switching device based on said identification of the second packet switching device included in the request packet;
   wherein the first packet switching device, the second packet switching device, and the application node are different standalone network devices in the network.

2. The method of claim 1, wherein the FIB is derived by the first packet switching device data received using an exterior network protocol.

3. The method of claim 2, wherein the exterior network protocol is Border Gateway Protocol (BGP).

4. The method of claim 3, wherein the particular application node does not run Border Gateway Protocol (BGP).

5. The method of claim 4, wherein the particular application node runs an Interior Gateway Protocol (IGP); wherein the method comprises: performing, by the particular application node, a lookup operation on a network address of the second packet switching device to determine how to send the resulting packet to the second packet switching device.

6. The method of claim 5, wherein the IGP is Intermediate system to Intermediate System (IS-IS) or Open Shortest Path First (OSPF).

7. The method of claim 6, wherein none of said one or more application nodes run Border Gateway Protocol (BGP).

8. The method of claim 5, wherein the request packet includes a service identification of at least one service of said one or more services to be applied to the representation of the native packet by said one or more application nodes; and wherein said one or more application nodes are configured to apply said at least one service of said one or more services to the representation of the native packet.

9. The method of claim 5, wherein said one or more services include at least one service from a group of services consisting of: layer-4, layer-5, layer-6, and layer-7 services.

10. The method of claim 9, wherein said one or more services include at least one service from a group of services consisting of: Firewall (FW), Network Address Translation (NAT), Network-based Application Recognition (NBAR), authentication, encryption and Internet Protocol Security (IPsec).

11. The method of claim 10, wherein the request packet includes an identification of a virtual private network (VPN) to which the native packet is associated; wherein the resulting packet includes a VPN value corresponding to the identification of the VPN.

12. The method of claim 11, wherein the resulting packet includes a Multiprotocol Label Switching (MPLS) label stack, including one or more labels for reaching the second packet switching device, and a label including the VPN value.

13. The method of claim 10, wherein the request packet includes a service identification of at least one service of said one or more services to be applied to the representation of the native packet by said one or more application nodes; and wherein said one or more application nodes are configured to apply said at least one service of said one or more services to the representation of the native packet.

14. The method of claim 1, comprising: determining, by the second packet switching device, how to send the request packet to an external device, which will then forward the request packet based on a destination address in a packet header of the request packet; and forwarding the request packet to the external device.

15. A packet switching device, comprising:
   a plurality of interfaces configured for sending and receiving packets; and
   one or more communications mechanisms configured for communicating packets among the plurality of interfaces;
   wherein the packet switching device is configured to:
   determine forwarding information based on an exterior network protocol;
   perform a lookup operation in said forwarding information based on a destination address of a native packet to determine a second packet switching device to which the packet switching device should forward the native packet; and
   send a request packet to an application node of one or more application nodes for applying one or more services to a representation of the native packet and to send a resulting result packet to the second packet switching device, with the request packet including the representation of the native packet and an identification of the second packet switching device;
   wherein the second packet switching device is not one of said one or more application nodes;
   wherein the packet switching device, the second packet switching device, and the application node are different standalone network devices.

16. The method of claim 15, wherein the request packet includes a service identification of at least one service of said one or more services to be applied to the representation of the native packet by said one or more application nodes; and wherein said one or more application nodes are configured to apply said at least one service of said one or more services to the representation of the native packet.

17. The method of claim 16, wherein the exterior network protocol is Border Gateway Protocol (BGP); and wherein none of said one or more application nodes runs BGP.

18. A method, comprising:
   receiving a request packet by an application node of one or more application nodes from a sending packet switching device, with the request packet including a representation of a native packet and an identification of a particular packet switching device;
   applying, by said one or more application nodes, one or more services to the representation of a native packet resulting in a result packet; and
   sending the result packet to the particular packet switching device based on the identification of the particular packet switching device included in the request packet;
   wherein the particular packet switching device is not one of said one or more application nodes;
   wherein the sending packet switching device, the particular packet switching device, and the application node are different standalone network devices.

19. The method of claim 18, wherein said one or more application nodes do not include an exterior network protocol forwarding data structure for determining how to forward the result packet based on a destination address of the result packet; wherein the destination address of the result packet does not correspond to the particular packet switching device.

20. The method of claim 19, wherein the exterior network protocol is Border Gateway Protocol (BGP).

21. The method of claim 18, wherein said one or more services include at least one service from a group of services consisting of: Firewall (FW), Network Address Translation (NAT), Network-based Application Recognition (NBAR), authentication, encryption and Internet Protocol Security (IPsec).

* * * * *